(12) United States Patent
Lim et al.

(10) Patent No.: US 12,186,888 B2
(45) Date of Patent: Jan. 7, 2025

(54) ROBOT APPARATUS AND CONTROLLING METHOD THEREOF

(71) Applicant: SAMSUNG ELECTRONICS CO., LTD., Suwon-si (KR)

(72) Inventors: Baeseok Lim, Suwon-si (KR); Hyunsuk Kwak, Suwon-si (KR); Dongsik Yun, Suwon-si (KR); Jaemyung Cho, Suwon-si (KR); Youngjae Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 243 days.

(21) Appl. No.: 17/938,507

(22) Filed: Oct. 6, 2022

(65) Prior Publication Data
US 2023/0148037 A1 May 11, 2023

Related U.S. Application Data

(63) Continuation of application No. PCT/KR2022/013881, filed on Sep. 16, 2022.

(30) Foreign Application Priority Data

Nov. 5, 2021 (KR) .......................... 10-2021-0151481

(51) Int. Cl.
*B25J 5/00* (2006.01)
*B25J 13/00* (2006.01)
(52) U.S. Cl.
CPC ................................... *B25J 13/006* (2013.01)
(58) Field of Classification Search
CPC ..... B25J 9/12; B25J 5/00; B25J 11/008; B25J 11/00; B25J 9/10; B25J 13/006; B25J 9/16; B25J 9/0009
See application file for complete search history.

(56) References Cited

U.S. PATENT DOCUMENTS 7,720,572 B2 * 5/2010 Ziegler .................. B25J 11/008
713/153
7,957,837 B2 * 6/2011 Ziegler ................ G05D 1/0246
901/1
(Continued)

FOREIGN PATENT DOCUMENTS

CN 209504127 U 10/2019
CN 210115916 U 2/2020
(Continued)

OTHER PUBLICATIONS

Zhao et al., Modeling of biped robot, 2010, IEEE, p. 2333-3238 (Year: 2010).*
(Continued)

*Primary Examiner* — McDieunel Marc
(74) *Attorney, Agent, or Firm* — Sughrue Mion, PLLC

(57) ABSTRACT

A robot apparatus is disclosed. The robot apparatus includes a main body; a display; a neck structure rotatably connected to the main body; a first driving device configured to rotate the neck structure such that the display is positioned in a first location, in which a display surface of the display faces toward an upper direction, or a second location, in which the display surface faces toward a front direction; a stopper structure provided on the main body to be adjacent to the neck structure; and a second driving device configured to move the stopper structure toward the front direction or a rear direction such that the stopper structure is positioned in a supporting location in which the stopper structure contacts a rear surface of the neck structure, or a separated location, in which the stopper structure is spaced apart from the neck structure.

15 Claims, 13 Drawing Sheets

(56) References Cited

U.S. PATENT DOCUMENTS

| | | | |
|---|---|---|---|
| 8,195,333 B2* | 6/2012 | Ziegler | B25J 19/023 |
| | | | 318/568.25 |
| 8,583,282 B2* | 11/2013 | Angle | B25J 19/0091 |
| | | | 700/245 |
| 8,588,978 B2 | 11/2013 | Choi et al. | |
| 8,698,965 B2 | 4/2014 | Choi et al. | |
| 8,935,006 B2* | 1/2015 | Vu | B25J 5/007 |
| | | | 901/1 |
| 9,446,510 B2* | 9/2016 | Vu | G16H 40/63 |
| 10,239,202 B1* | 3/2019 | Huang | B25J 11/001 |
| 10,661,433 B2* | 5/2020 | Angle | G16H 20/13 |
| 11,077,546 B2 | 8/2021 | Jung et al. | |
| 11,383,387 B2 | 7/2022 | Youn et al. | |
| 11,446,811 B2 | 9/2022 | Lee et al. | |
| 2009/0278018 A1 | 11/2009 | Park et al. | |
| 2012/0303160 A1* | 11/2012 | Ziegler | G05D 1/0246 |
| | | | 700/259 |
| 2019/0033858 A1 | 1/2019 | Wang et al. | |
| 2020/0009740 A1 | 1/2020 | Youn et al. | |
| 2020/0206895 A1 | 7/2020 | Jung et al. | |
| 2021/0001477 A1 | 1/2021 | Jung et al. | |
| 2021/0166592 A1 | 6/2021 | Kang et al. | |

FOREIGN PATENT DOCUMENTS

| | | | |
|---|---|---|---|
| JP | 6250507 B2 | 12/2017 | |
| JP | 7163744 B2 | 11/2022 | |
| KR | 20-0441761 Y1 | 9/2008 | |
| KR | 10-1217123 B1 | 12/2012 | |
| KR | 10-1496909 B1 | 2/2015 | |
| KR | 10-1496910 B1 | 2/2015 | |
| KR | 10-1870629 B1 | 6/2018 | |
| KR | 10-2019-0013581 A | 2/2019 | |
| KR | 10-2019-0100088 A | 8/2019 | |
| KR | 10-2020-0085657 A | 7/2020 | |
| KR | 10-2021-0067406 A | 6/2021 | |
| KR | 10-2021-0098563 A | 8/2021 | |

OTHER PUBLICATIONS

Alarcon et al., Control of Mimicking Telepresent Robotic Neck using Oculus Rift, 2019, IEEE, pg. (Year: 2019).*

Hahimoto et al., Facial Expression of a Robot using a Curved Surface Display, 2024, IEEE, p. 1-6 (Year: 2024).*

Lim et al., Basic Emotional Walking Using a Biped Humanoid Robot , 1999, IEEE, p. 1-6 (Year: 1999).*

International Search Report (PCT/ISA/210) and Written Opinion (PCT/ISA/237) dated Dec. 22, 2022 issued by the International Searching Authority in International Application No. PCT/KR2022/013881.

Communication dated Aug. 2, 2024, issued by the European Patent Office in European Application No. 22890166.6.

* cited by examiner

ROBOT APPARATUS AND CONTROLLING METHOD THEREOF

CROSS-REFERENCE TO RELATED APPLICATION(S)

This application is a bypass continuation application of International Application No. PCT/KR2022/013881, filed on Sep. 16, 2022, which is based on and claims priority to Korean Patent Application No. 10-2021-0151481, filed on Nov. 5, 2021, in the Korean Intellectual Property Office, the disclosure of which is incorporated by reference herein in its entirety.

BACKGROUND

1. Field

The disclosure relates to a robot apparatus, and more particularly, to a robot apparatus that has an improved structure such that a display that is rotatable with respect to a main body is supported stably by a stopper structure, and a controlling method thereof.

2. Description of Related Art

A display provided in a head part of a robot apparatus may be configured such that its display surface faces toward an upper direction while being mounted on a main body of the robot apparatus for performing a role of a guide or a kiosk at ordinary times, and configured such that its display surface faces toward a front direction by rotating in a direction of moving away from the head part of the robot apparatus for an interaction with a user.

In a state in which the display is rotated in a direction of moving away from the head part, when the robot apparatus is being driven, there is a problem that the display is shaken due to a vibration transmitted from the ground or a user's touch operation.

SUMMARY

Example embodiments of the disclosure provide a robot apparatus that has an improved structure such that a display rotatable with respect to a main body is supported stably by a stopper structure, and a controlling method thereof.

According to an aspect of an example embodiment, there is provided a robot apparatus including: a main body; a display; a neck structure rotatably connected to the main body, and of which an end portion is connected to a rear surface of the display; a first driving device configured to rotate the neck structure around a first axis of the robot apparatus such that the display is positioned in a first location, in which a display surface of the display faces toward an upper direction, or a second location, in which the display surface faces toward a front direction; a stopper structure provided on the main body to be adjacent to the neck structure; and a second driving device configured to move the stopper structure toward the front direction or a rear direction such that the stopper structure is positioned in a supporting location in which the stopper structure contacts a rear surface of the neck structure, or a separated location, in which the stopper structure is spaced apart from the neck structure.

The first driving device may include: a shaft member rotatably connected to the main body, and provided along the first axis; a first motor configured to rotate the shaft member; and a rotation link connecting the neck structure and the shaft member.

The shaft member may be provided below the display.

The first driving device may further include: a first assistant link of which a first end portion is connected to the first motor; a second assistant link of which a first end portion is connected to a second end portion of the first assistant link; and a third assistant link of which a first end portion is connected to a second end portion of the second assistant link, of which a second end portion is connected to the shaft member, the third assistant link having a length longer than the first assistant link.

The stopper structure may be provided at a same height as the shaft member.

The second driving device may include a guide member, which contacts the stopper structure and configured to guide a moving path of the stopper structure.

The second driving device may include: a cam member of which a cross section has an ellipse shape, and which contacts the stopper structure; a second motor configured to rotate the cam member; a support which is fixed on the main body; and a pressure member of which a front end portion is connected to the stopper structure, and of which a rear end portion is connected to the support, the pressure member being configured to pressurize the stopper structure to the front direction.

The second motor may be configured to rotate the cam member in a first direction by 90 degrees, or rotate the cam member in a second direction opposite to the first direction by 90 degrees.

A radius of curvature of the rear surface of the neck structure may be identical to a radius of curvature of a front surface of the stopper structure.

An upper surface of the main body may extend from an upper end of a front surface of the main body toward the rear direction, and the display in the first location may be on the upper surface of the main body.

The main body may include a slot formed on the upper surface of the main body, and the neck structure may be withdrawn to an outside of the main body, or is inserted to an inside of the main body through the slot.

The robot apparatus may further include a processor configured to: based on a predetermined event occurring, control the second driving device such that the stopper structure moves to the separated location, and based on the stopper structure moving to the separated location, control the first driving device such that the neck structure rotates to a location corresponding to the predetermined event and stops after rotation, and based on the neck structure stopping, control the second driving device such that the stopper structure moves to the supporting location.

The robot apparatus may further include a third driving device configured to rotate the display around a second axis of the robot apparatus, and is supported by the rear surface of the display.

The robot apparatus may further include a traveling device configured to move the main body.

According to an aspect of an example embodiment, there is provided a method of controlling a robot apparatus including a main body, a display, a neck structure which connects the main body and the display, and a stopper structure provided adjacent to the neck structure, the method including: receiving a rotation signal; moving the stopper structure to a separated location in which the stopper structure is spaced apart from the neck structure; rotating the neck structure to a location corresponding to the rotation signal and stopping the neck structure after rotation; and moving the stopper structure to a supporting location in which the stopper structure contacts with the rear surface of the neck structure.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

The embodiments that will be described below are exemplary embodiments for promoting understanding of the disclosure, and it should be understood that the disclosure may be implemented while being modified in various forms, unlike the embodiments described herein. In explaining the disclosure below, in case it is determined that detailed explanation of related known functions or components may unnecessarily confuse the gist of the disclosure, the detailed explanation and detailed illustration thereof will be omitted. Also, in the accompanying drawings, some components may not be illustrated in their actual scales, but may be illustrated in more enlarged sizes than their actual sizes, for promoting understanding of the disclosure.

Also, as terms used in this specification and the claims, general terms were selected in consideration of the functions described in the disclosure. However, the terms may vary depending on the intention of those skilled in the art who work in the pertinent field or legal or technical interpretation, or emergence of new technologies, etc. Also, there are some terms that were designated by the applicant on his own, and in such cases, the meaning of the terms may be interpreted as what is defined in this specification. If there is no specific definition of the terms, the meaning of the terms may be interpreted based on the overall content of this specification and technical knowledge common in the pertinent technical field.

In addition, in this specification, expressions such as "have," "may have," "include," and "may include" denote the existence of such characteristics (e.g.: elements such as numerical values, functions, operations, and components), and do not exclude the existence of additional characteristics.

Also, in this specification, elements necessary for explanation of each embodiment of the disclosure are described, and thus elements are not necessarily limited thereto. Accordingly, some elements may be changed or omitted, or other elements may be added. Also, elements may be disposed to be dispersed in apparatuses independent from one another.

Further, while the embodiments of the disclosure will be described in detail with reference to the following accompanying drawings and the contents described in the accompanying drawings, it is not intended that the disclosure is restricted or limited by the embodiments.

Hereinafter, the disclosure will be described in more detail with reference to the accompanying drawings.

Figure 1A:
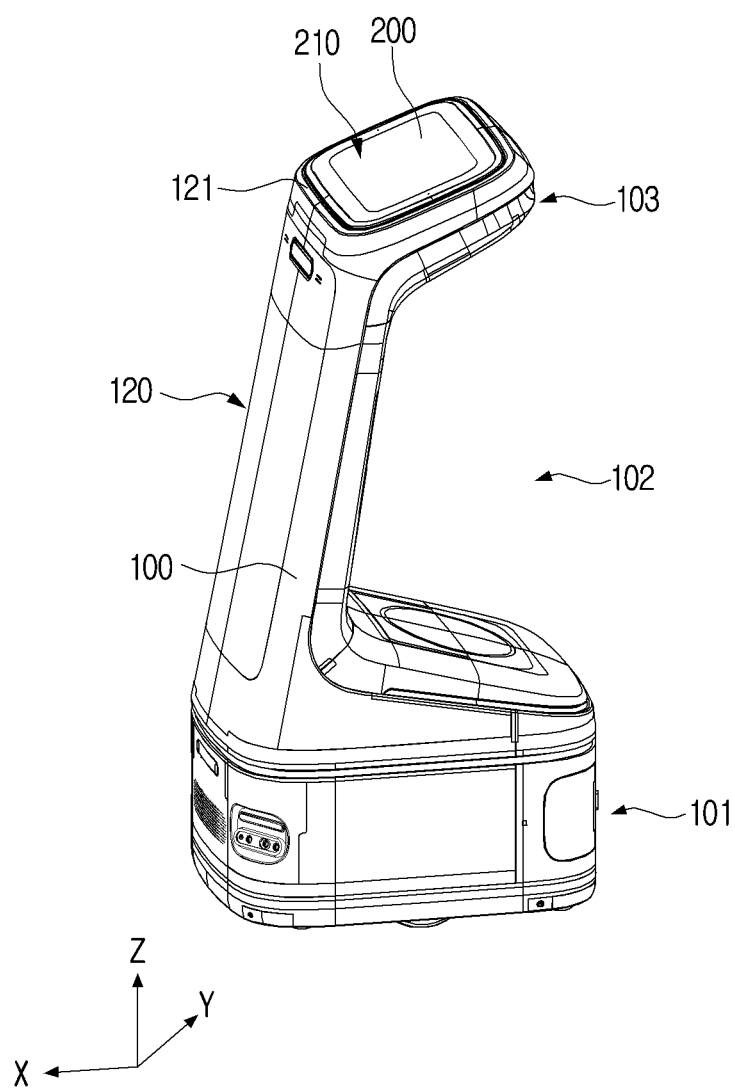
FIGS. 1A and 1B are perspective views of a robot apparatus according to an embodiment of the disclosure.
Figure 1B:
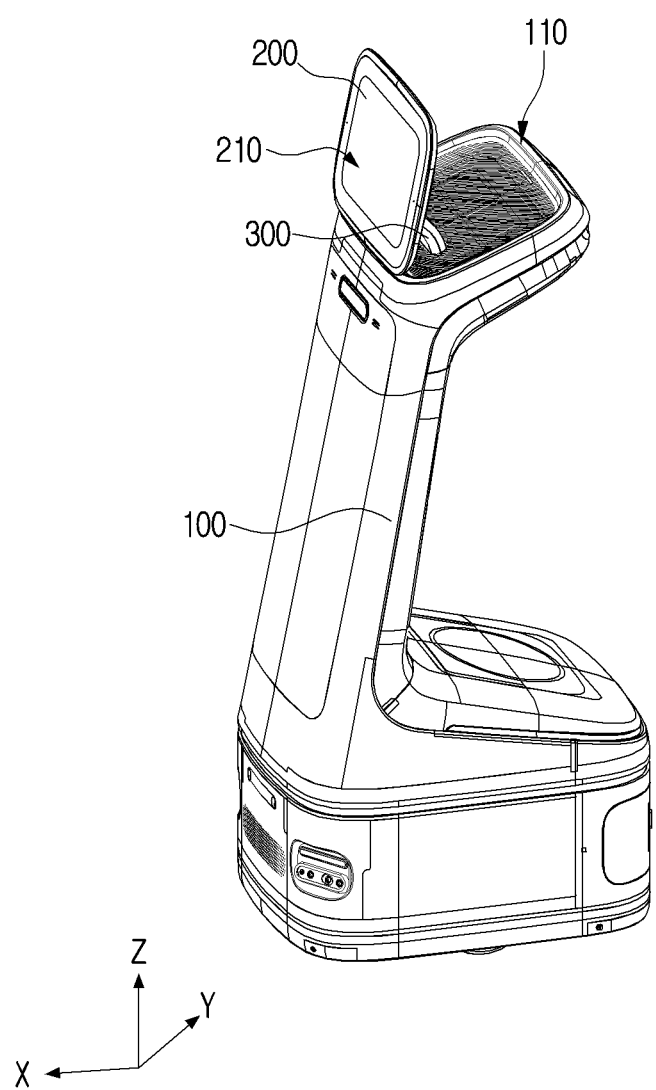
Figure 2:
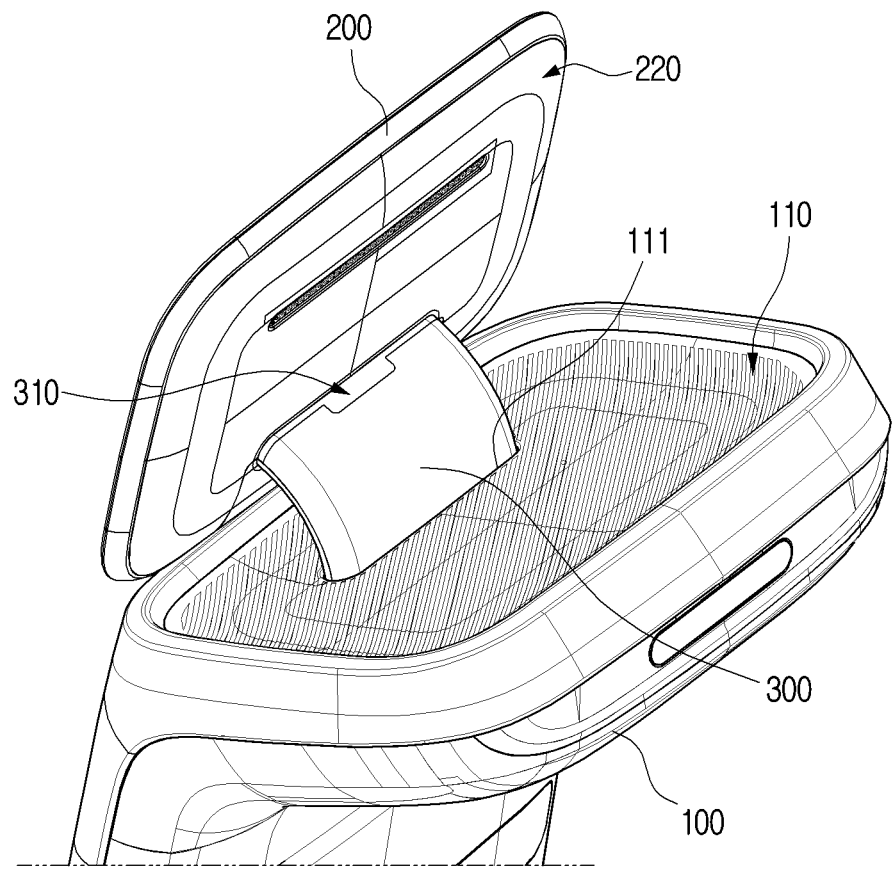
FIG. 2 is a perspective view illustrating a state wherein a display member is supported by a neck structure in a robot apparatus according to an embodiment of the disclosure.
Figure 3:
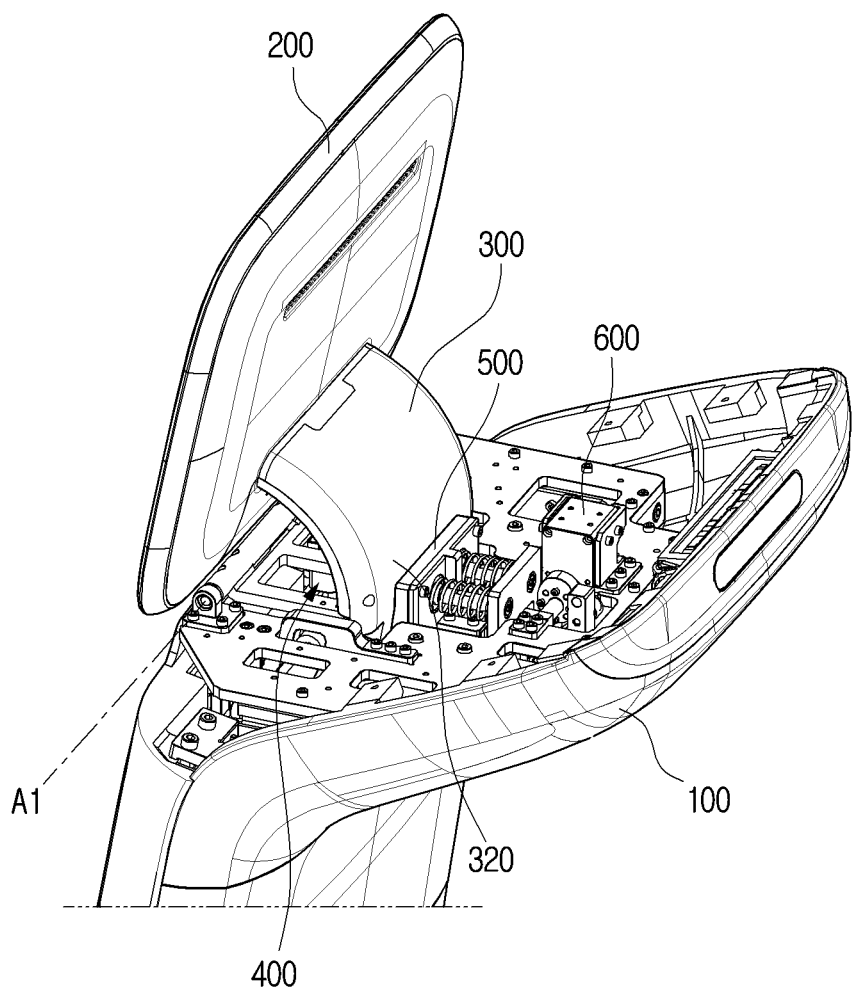
FIG. 3 is a perspective view illustrating a state wherein a cover has been removed from a main body in FIG. 2 according to an embodiment of the disclosure.

FIGS. 1A and 1B are perspective views of a robot apparatus according to an embodiment of the disclosure. FIG. 2 is a perspective view illustrating a state wherein a display member (or a display) is supported by a neck structure (or neck structure) in a robot apparatus according to an embodiment of the disclosure. FIG. 3 is a perspective view illustrating a state wherein a cover has been removed from the main body in FIG. 2 according to an embodiment of the disclosure.

Referring to FIG. 1 to FIG. 3, a robot apparatus 1 according to an embodiment of the disclosure may include a main body 100, a display member 200, a neck structure (or neck structure) 300, a first driving device 400, a stopper structure 500, and a second driving device 600.

The main body 100 may include a driving part 101, a body part 102, and a head part 103 that are stacked in order from the lower side to the upper side. On the lower side of the driving part 101, one or more wheels may be provided. In the driving part 101, a traveling device 900 (refer to FIG. 6) that moves the main body 100 may also be accommodated. Also, in the driving part 101, one or more sensors (e.g., an optical sensor, an acceleration sensor, etc.) that are used for driving of the main body 100 may be accommodated.

The body part 102 may have thinner thickness than the driving part 101, and may be extended from the driving part 101 toward a rear direction (e.g., −X axis direction in FIG. 1A) while being tilted by a predetermined angle. On a front surface (e.g., a surface in a direction of X axis in FIG. 1A) of the body part 102, a display capable of providing information may be provided.

The head part 103 may be extended from an upper end of the body part 102 toward the rear direction while being tilted by a predetermined angle. That is, an upper surface 110 of the main body 100 may be formed to extend from an upper end 121 of the front surface 120 of the main body 100 toward the rear direction. The display member 200 may be mounted on the upper surface 110 of the main body 100 in a first location. The head part 103 may have a size corresponding to the display member 200.

The display member 200 may be disposed in the first location wherein the display surface 210 faces toward an upper direction (e.g., Z axis direction in FIG. 1A) or in a second location wherein the display surface 210 faces toward the front direction (e.g., X axis direction in FIG. 1B). That is, the display member 200 may be disposed in the first location as shown in FIG. 1A, and may be disposed in the second location as shown in FIG. 1B.

When the display member 200 is disposed in the second location, the display member 200 may be disposed side by side with the front surface 120 of the main body 100. That is, the display member 200 disposed in the second location may be disposed to be tilted toward the rear direction by a predetermined angle based on a vertical line.

The display member 200 may include a touch sensor and perform a role of a touch screen. Thus, a user may transmit a signal to the robot apparatus 1 by touching the display member 200.

The display member 200 disposed in the first location may function as a kiosk. The display member 200 disposed in the second location may interact with a user, e.g., by providing an image expressing an emotion or a friendly facial expression. Also, the display member 200 may perform a motion of nodding or tilting for expressing an emotion.

The neck structure 300 may be connected rotatably to the main body 100, and an end portion 310 of the neck structure 300 may be connected to a rear surface 220 of the display member 200. The neck structure 300 may rotate around a horizontal rotation axis A1 of the main body 100. The horizontal rotation axis A1 may be horizontal to the ground, and may be disposed along a Y axis direction in FIG. 1A. Accordingly, the display member 200 may move to the first location or the second location.

The main body 100 may include a slot 111 formed on the upper surface 110 of the main body 100. The neck structure 300 may be withdrawn to the outside of the main body 100 or may be inserted to the inside of the main body 100 through the slot 111. That is, when the display member 200 is disposed in the first location, the neck structure 300 may be inserted to the inside of the main body 100, and when the display member 200 is disposed in the second location, the neck structure 300 may be withdrawn to the outside of the main body 100.

The first driving device 400 may rotate the neck structure 300 around the horizontal rotation axis A1, such that the display member 200 is disposed in the first location or the second location.

The stopper structure 500 may be disposed in a supporting location that contacts a rear surface 320 of the neck structure 300 or in a separated location that is spaced apart from the neck structure 300. The second driving device 600 may move the stopper structure 500 to the front direction (e.g., X axis in FIG. 1A) or the rear direction (e.g., –X axis in FIG. 1A), such that the stopper structure 500 is disposed in the supporting location or the separated location.

When the stopper structure 500 is in the supporting location, the neck structure 300 is not pushed to the rear direction, but is supported stably by the frictional force provided by the stopper structure 500. Thus, the display member 200 may not be shaken by vibration that may occur while driving of the robot apparatus 1, e.g., vibration transmitted from the ground or vibration according to a user's touch operation.

Also, when the stopper structure 500 is disposed in the separated location, the neck structure 300 may rotate freely in a state of being spaced apart from the stopper structure 500. That is, when the display member 200 moves to the first location or the second location, the stopper structure 500 moves to the separated location, and thus the display member 200 and the neck structure 300 may rotate easily without being interrupted by the stopper structure 500.

Figure 4:
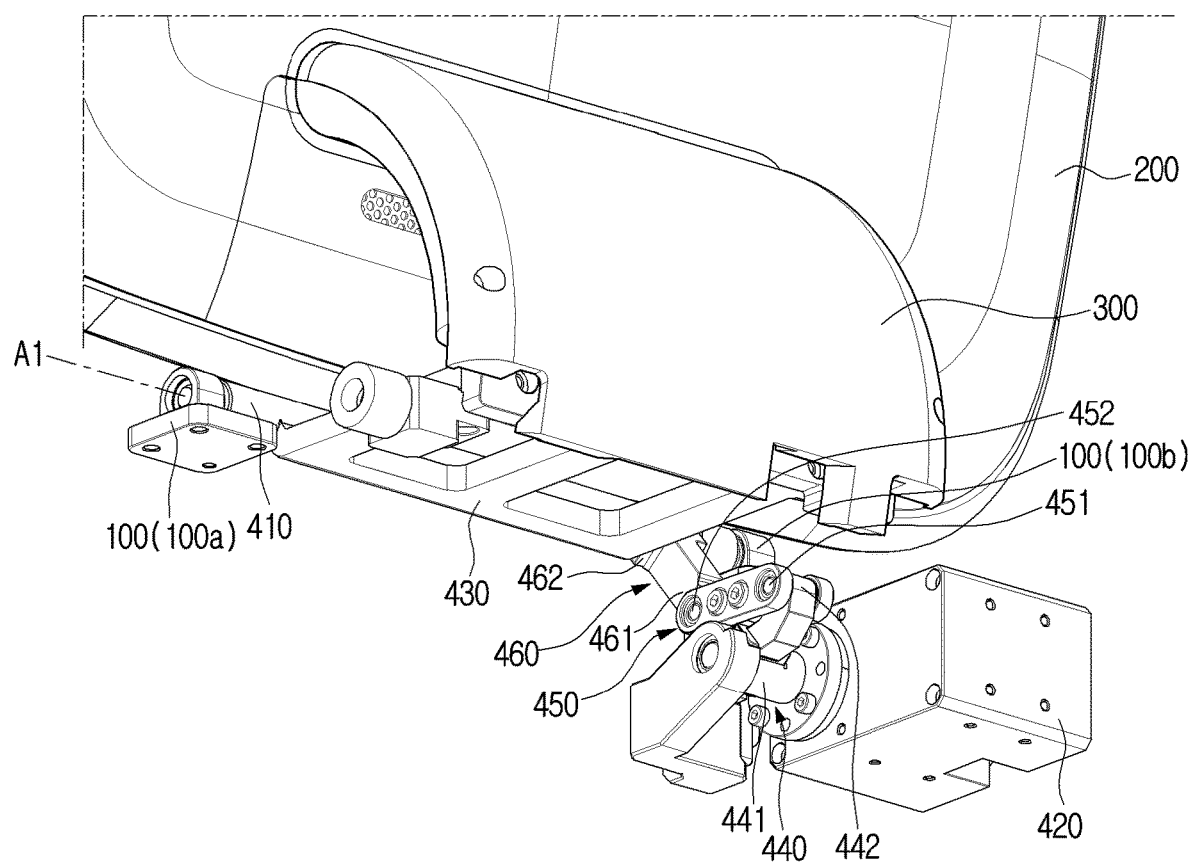
FIG. 4 is a perspective view illustrating a configuration of a first driving device in a robot apparatus according to an embodiment of the disclosure.

FIG. 4 is a perspective view illustrating a configuration of a first driving device in a robot apparatus according to an embodiment of the disclosure.

Referring to FIG. 4, the first driving device 400 may include a shaft member 410, a first motor 420, a rotation link 430, a first assistant link 440, a second assistant link 450, and a third assistant link 460.

The shaft member 410 may be connected rotatably to the main body 100. Both ends of the shaft member 410 may be supported rotatably by two vertical ends 100a, 100b of the main body 100. The shaft member 410 may be disposed along the horizontal rotation axis A1. That is, the shaft member 410 may define the horizontal rotation axis A1.

The shaft member 410 may be disposed in a lower location than the display member 200. Accordingly, the display member 200 may rotate to the first location or the second location without interfering with the main body 100.

The first motor 420 may rotate the shaft member 410. The rotation link 430 may include a rotation link 430 connecting the neck structure 300 and the shaft member 410. That is, the shaft member 410, the rotation link 430, the neck structure 300, and the display member 200 may rotate integrally at the same angular velocity.

One end 441 of the first assistant link 440 may be connected to the first motor 420. One end 451 of the second assistant link 450 may be connected to the other end 442 of the first assistant link 440. One end 461 of the third assistant link 460 may be connected to the other end 452 of the second assistant link 450, and the other end 462 may be connected to the shaft member 410.

That is, three assistant links connected in series may connect the first motor 420 and the shaft member 410.

The third assistant link 460, the shaft member 410, the rotation link 430, and the neck structure 300 may be connected integrally, and all of them may rotate around the horizontal rotation axis A1 at the same angular velocity.

The third assistant link 460 may have longer length than the first assistant link 440. Accordingly, the third assistant link 460 may rotate at slower angular velocity than the first assistant link 440, and thus the torque generated from the first motor 420 may be amplified and transmitted to the third assistant link 460. The display member 200 and the neck structure 300 may rotate effectively through the first motor 420 having a small capacity.

Figure 5:
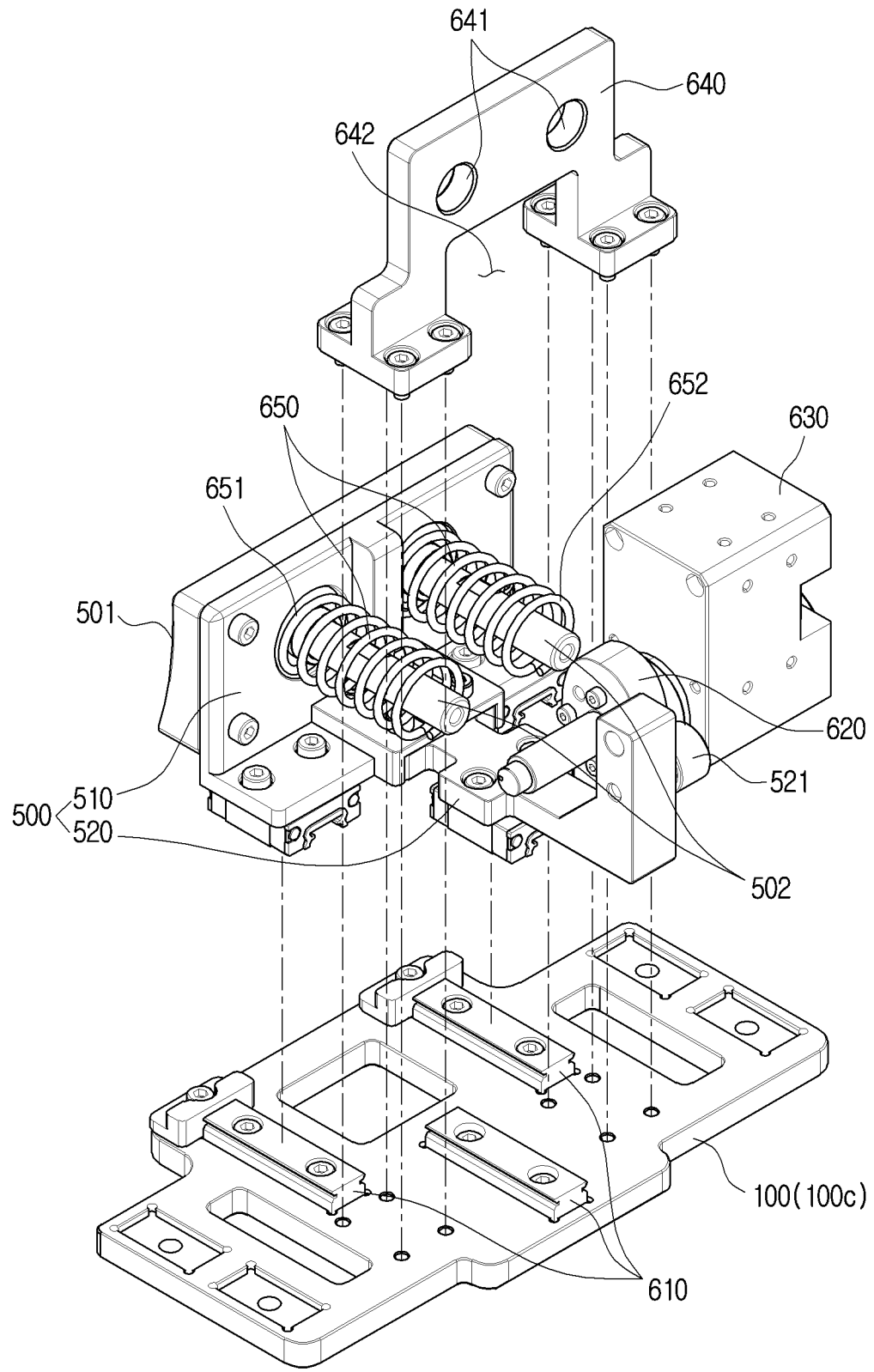
FIG. 5 is an exploded perspective view illustrating a configuration of a second driving device in a robot apparatus according to an embodiment of the disclosure.

FIG. 5 is an exploded perspective view illustrating a configuration of a second driving device in a robot apparatus according to an embodiment of the disclosure.

Referring to FIG. 5, the stopper structure 500 may include a guide rod 502, a braking part 510, and a moving part 520. The second driving device 600 may include a guide member 610, a cam member 620, a second motor 630, a support 640, and a pressure member 650.

The guide rod 502 may be inserted into a first hole 641 of the support 640 that will be described below, and may be disposed coaxially with the pressure member 650. The pressure member 650 has a bigger diameter than the first hole 641, and thus it may be supported by the front surface of the support 640.

The guide rod 502 may be disposed side by side with the guide member 610, and may be disposed to be enclosed by the pressure member 650. The pressure member 650 may not be detached from a designated location by the guide rod 502.

The braking part 510 may be disposed in the front end part of the stopper structure 500, and may be disposed to face the neck structure 300. The braking part 510 may be an area that selectively contacts the neck structure 300.

The moving part 520 may be disposed in the rear end part of the stopper structure 500, and may have smaller width length than the braking part 510. The moving part 520 may be an area that contacts the second motor 630 and receives the moving force to the rear direction from the second motor 630. The moving part 520 may move to the front direction or the rear direction in a state of penetrating through a second hole 642 of the support 640.

The guide member 610 may contact the stopper structure 500 and guide a moving path of the stopper structure 500. The guide member 610 may be fixedly disposed on a horizontal plate 100c of the main body 100.

The guide member 610 may be engaged with a slider disposed on a lower end of the stopper structure 500 and support the stopper structure 500 toward an upper side of the stopper structure 500, and guide the stopper structure 500 such that the stopper structure 500 moves to the front direction or the rear direction along the guide member 610.

The cross section of the cam member 620 may have an ellipse shape, and the cam member 620 may contact the stopper structure 500. The second motor 630 may rotate the cam member 620.

That is, the lengths of the long axis and the short axis of the cam member 620 may be different from each other. Accordingly, when the cam member 620 rotates in a first direction R1 (refer to FIG. 8) by 90 degrees, the rear end of the moving part 520 that contacts the cam member 620 may be pushed to the rear direction.

The rear end of the moving part 520 may include a projection 521 that is projectingly formed toward the second motor 630. The projection 521 of the moving part 520 may have a conical shape, and the projection 521 may always circumscribe around the cam member 620.

If the cam member 620 pushes the stopper structure 500 to the rear direction as it rotates, the pressure member 650 may be compressed by the support 640. Afterwards, when the cam member 620 rotates in a second direction R2 (refer to FIG. 10) opposite to the first direction R1 by 90 degrees, the pressure member 650 that was compressed may push the stopper structure 500 to the front direction. Accordingly, the stopper structure 500 may move from the separated location to the supporting location.

The support 640 may be fixedly disposed on the main body 100. The support 640 may be fixed on the horizontal plate 100c of the main body 100. The front surface of the support 640 may be disposed to face the braking part 510 on the front end of the stopper structure 500.

The front end 651 of the pressure member 650 may be connected to the stopper structure 500, and its rear end 652 may be connected to the support 640, and the pressure member 650 may pressurize the stopper structure 500 to the front direction. Specifically, the pressure member 650 is a compression spring, and its front end 651 may be connected to the rear surface of the braking part 510, and its rear end 652 may be connected to the front surface of the support 640.

Figure 6:
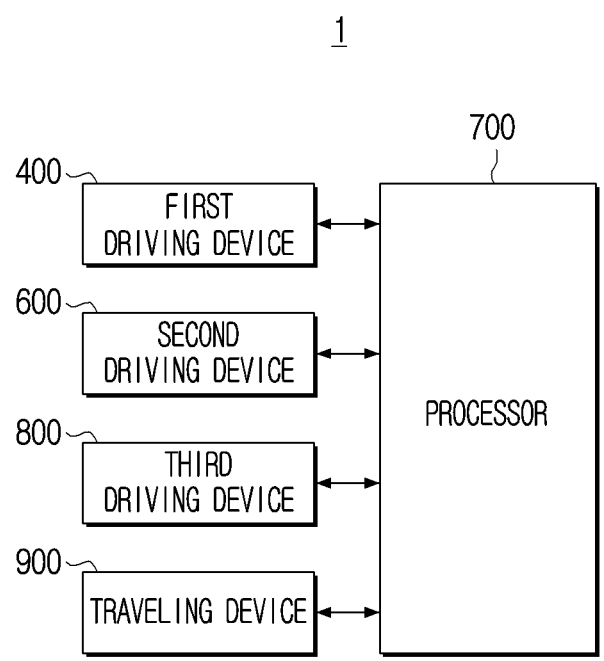
FIG. 6 is a block diagram schematically illustrating a controlling process of a robot apparatus according to an embodiment of the disclosure.

FIG. 6 is a block diagram schematically illustrating a controlling process of a robot apparatus according to an embodiment of the disclosure.

Referring to FIG. 6, a robot apparatus 1 may include a first driving device 400, a second driving device 600, a processor 700, a third driving device 800, and a traveling device 900. The traveling device 900 may include a known traveling mechanism (e.g., a motor or a wheel) to move the main body 100.

The processor 700 may control the overall operations of the robot apparatus 1. For this, the processor 700 may include one or more of a central processing unit (CPU), an application processor (AP), or a communication processor (CP). Also, the processor 700 may be a micro control unit (MCU).

The processor 700 may control hardware and/or software components connected to the processor 700 by driving an operation system or an application program, and perform various kinds of data processing and operations. Also, the processor 700 may load an instruction or data received from at least one of other components on a volatile memory and process them, and store various data in a non-volatile memory.

When a predetermined event occurs, the processor 700 may control the second driving device 600 such that the stopper structure 500 moves to the separated location.

The predetermined event may be a situation wherein a user transmits a rotation signal of the display member 200 to the processor 700 through an input device. Alternatively, the predetermined event may be a situation wherein a specific condition (e.g., a specific time, weather, etc.) for the display member 200 to rotate is satisfied without a separate input.

The input device may include, for example, a touch panel, a (digital) pen sensor, a key, or an ultrasonic input device. The touch panel, the pen sensor, and the key may be provided in the display member 200.

The touch panel may use, for example, at least one method among a capacitive method, a decompressive method, an infrared method, or an ultrasonic method. Also, the touch panel may further include a control circuit. The touch panel may further include a tactile layer, and provide a tactile response to a user. The (digital) pen sensor may be, for example, a part of the touch panel, or include a separate sheet for recognition. The key may include, for example, a physical button, an optical key, or a keypad. The ultrasonic input device may, for example, detect an ultrasonic wave generated at an input tool through a microphone, and identify data corresponding to the detected ultrasonic wave.

Also, the input device may be a terminal device such as a remote control, a smart watch, a smart band, a wireless headset, a mobile phone, a smartphone, a tablet, etc.

When the stopper structure 500 moves to the separated location, the processor 700 may control the first driving device 400 such that the neck structure 300 rotates to a location corresponding to the predetermined event and then stops.

When the neck structure 300 stops, the processor 700 may control the second driving device 600 such that the stopper structure 500 moves to the supporting location.

Figure 7:
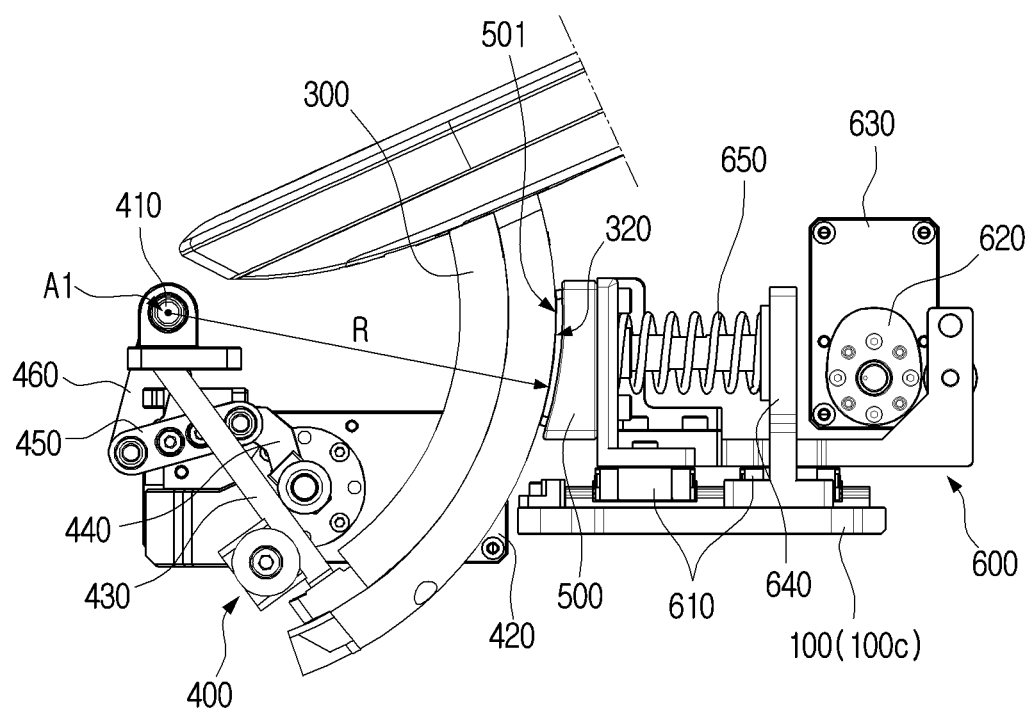
FIG. 7 is a side view illustrating a state wherein a display member is disposed in a first location, and a stopper structure is disposed in a supporting location in a robot apparatus according to an embodiment of the disclosure.

FIG. 7 is a side view illustrating a state wherein a display member is disposed in a first location, and a stopper structure is disposed in a supporting location in a robot apparatus according to an embodiment of the disclosure.

Referring to FIG. 7, the radius of curvature R of the rear surface 320 of the neck structure 300 may be identical to the radius of curvature R of the front surface 501 of the stopper structure 500. Accordingly, the rear surface 320 of the neck structure 300 and the front surface 501 of the stopper structure 500 come to contact in the largest area possible. Thus, the frictional force between the neck structure 300 and the stopper structure 500 are increased, and the neck structure 300 may be supported by the stopper structure 500 more stably.

The stopper structure 500 may be disposed at the same height as the shaft member 410. That is, the stopper structure 500 may support the neck structure 300 at the same height as the shaft member 410 defining the center of rotation of the neck structure 300. Accordingly, the pressurizing force of the stopper structure 500 to the front direction may be transmitted to the neck structure 300 with the smallest loss possible.

In the state of FIG. 7, the stopper structure 500 is pressurized to the front direction by the pressure member 650, and the neck structure 300 is also pressurized to the front direction by the stopper structure 500, and thus the first and second driving devices 400, 600 may not consume standby currents.

Figure 8:
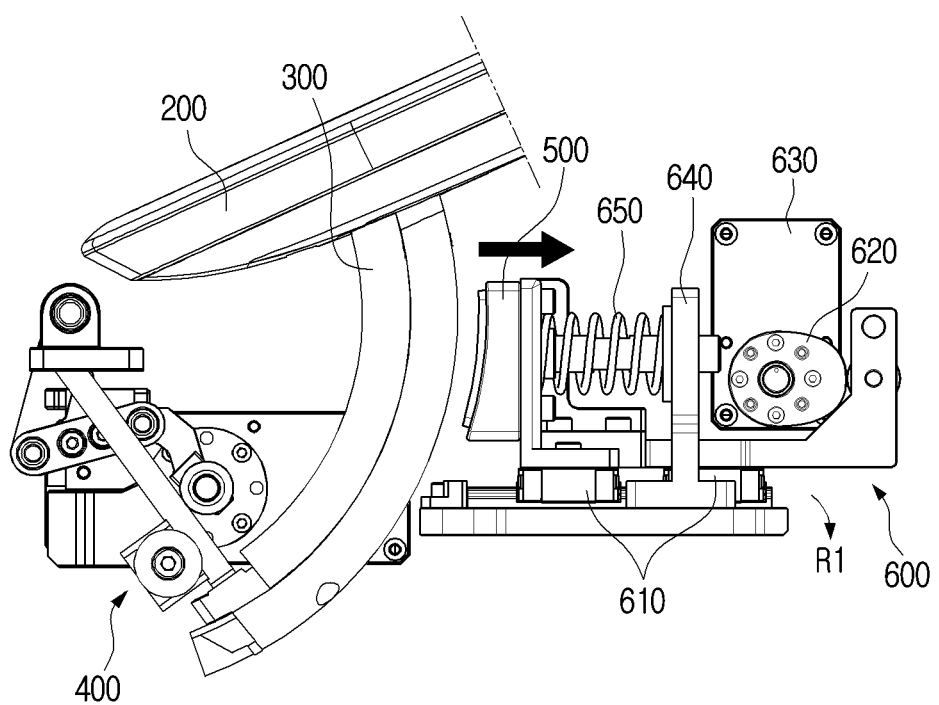
FIG. 8 is a side view illustrating a state wherein the stopper structure in FIG. 7 is moved backward from the supporting location to a separated location according to an embodiment of the disclosure.

FIG. 8 is a side view illustrating a state wherein the stopper structure in FIG. 7 is moved backward from the supporting location to the separated location according to an embodiment of the disclosure.

Referring to FIG. 8, the second driving device 600 may move the stopper structure 500 from the supporting location to the separated location. That is, if the second motor 630 rotates the cam member 620 in an ellipse shape in the first direction R1 by 90 degrees, the stopper structure 500 contacting the cam member 620 may be pushed to the rear direction. Here, the pressure member 650 may be compressed.

In the state of FIG. 8, the second driving device 600 may use a current only when rotating the cam member 620 in the first direction R1 by 90 degrees.

Figure 9:
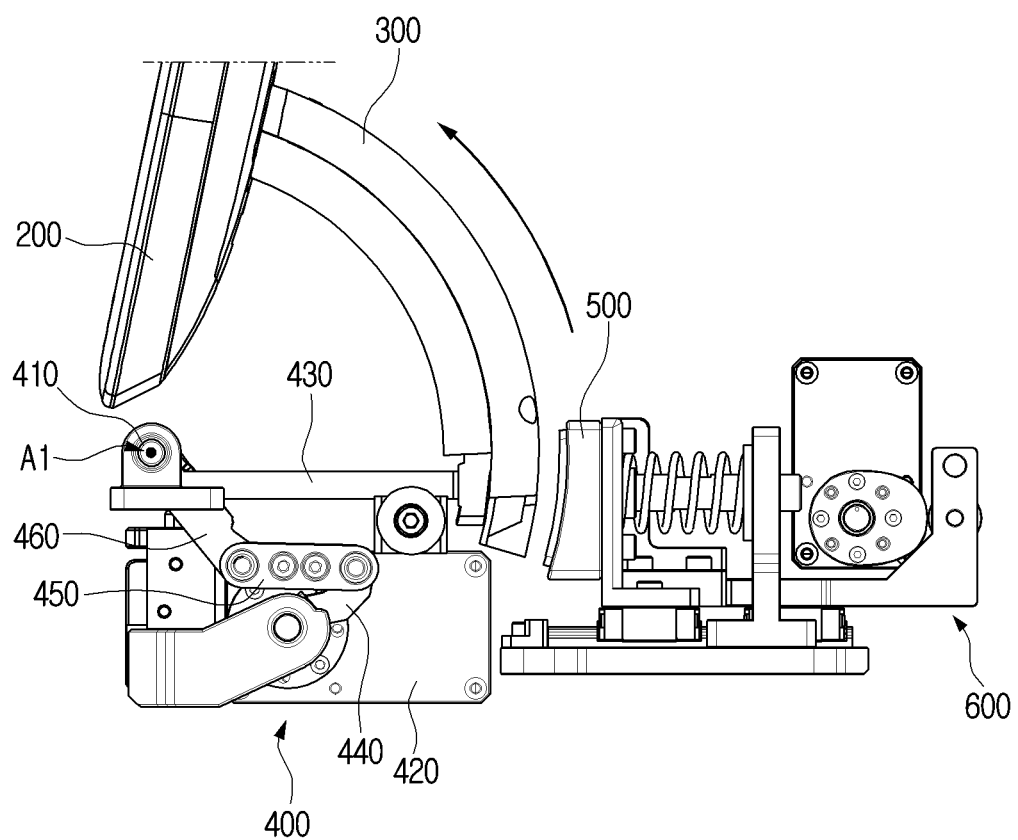
FIG. 9 is a side view illustrating a state wherein the display member in FIG. 8 rotated from the first location to a second location according to an embodiment of the disclosure.

FIG. 9 is a side view illustrating a state wherein the display member in FIG. 8 is rotated from a first location to a second location according to an embodiment of the disclosure.

Referring to FIG. 9, the first driving device 400 may be controlled such that, when the stopper structure 500 moves to the separated location, the neck structure 300 moves to a location corresponding to the predetermined event and then stops. That is, the neck structure 300 may rotate easily without contacting the stopper structure 500 disposed in the separated location.

In the state of FIG. 9, the second driving device 600 may not use a current, but only the first driving device 400 may use a current for the rotation of the display member 200.

Figure 10:
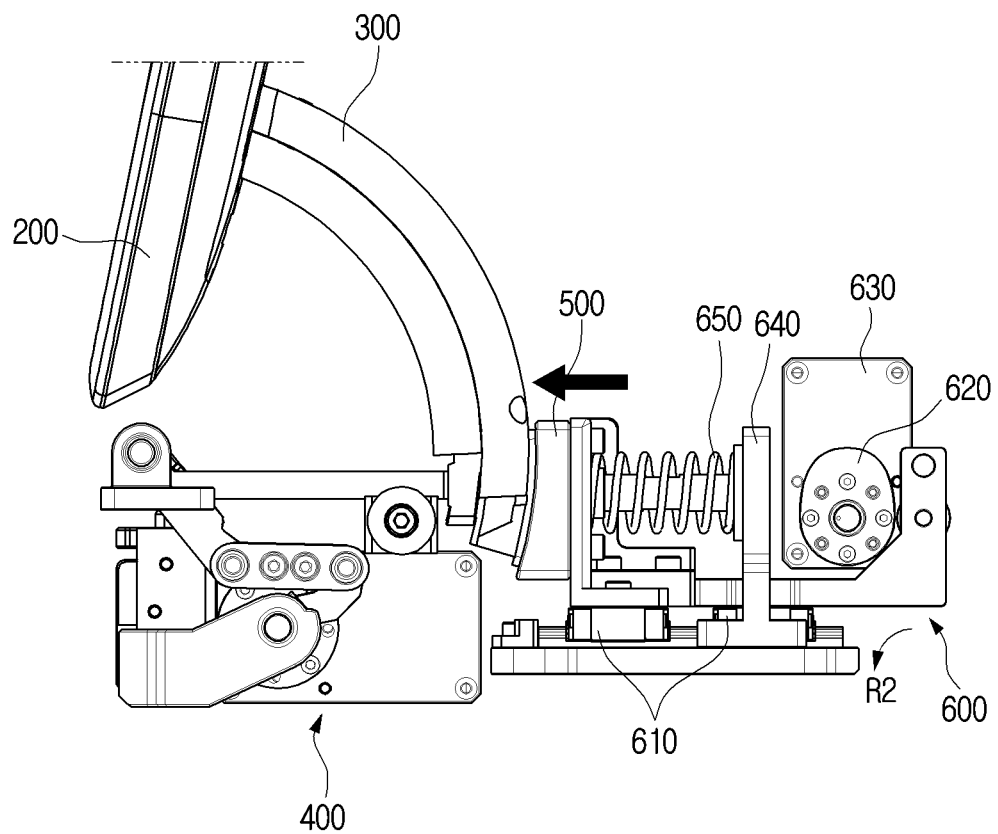
FIG. 10 is a side view illustrating a state wherein the stopper structure in FIG. 9 is moved forward from a separated location to the supporting location according to an embodiment of the disclosure.

FIG. 10 is a side view illustrating a state wherein the stopper structure in FIG. 9 is moved forward from a separated location to a supporting location according to an embodiment of the disclosure.

Referring to FIG. 10, when the neck structure 300 stops, the second driving device 600 may move the stopper structure 500 from the separated location to the supporting location. That is, if the cam member 620 rotates in the second direction R2 opposite to the first direction R1 by 90 degrees by the second motor 630, the pressure member 650 that was compressed may push the stopper structure 500 to the front direction. Accordingly, the stopper structure 500 may move from the separated location to the supporting location.

Afterwards, the stopper structure 500 is pressurized to the front direction by the pressure member 650, and the neck structure 300 is also pressurized to the front direction by the stopper structure 500, and thus the first and second driving devices 400, 600 may not consume standby currents.

That is, referring to FIG. 7 to FIG. 10, use of currents by the first and second driving devices 400, 600 may be minimized by the ellipse shape of the cam member 620 and the elastic force of the pressure member 650.

Figure 11:
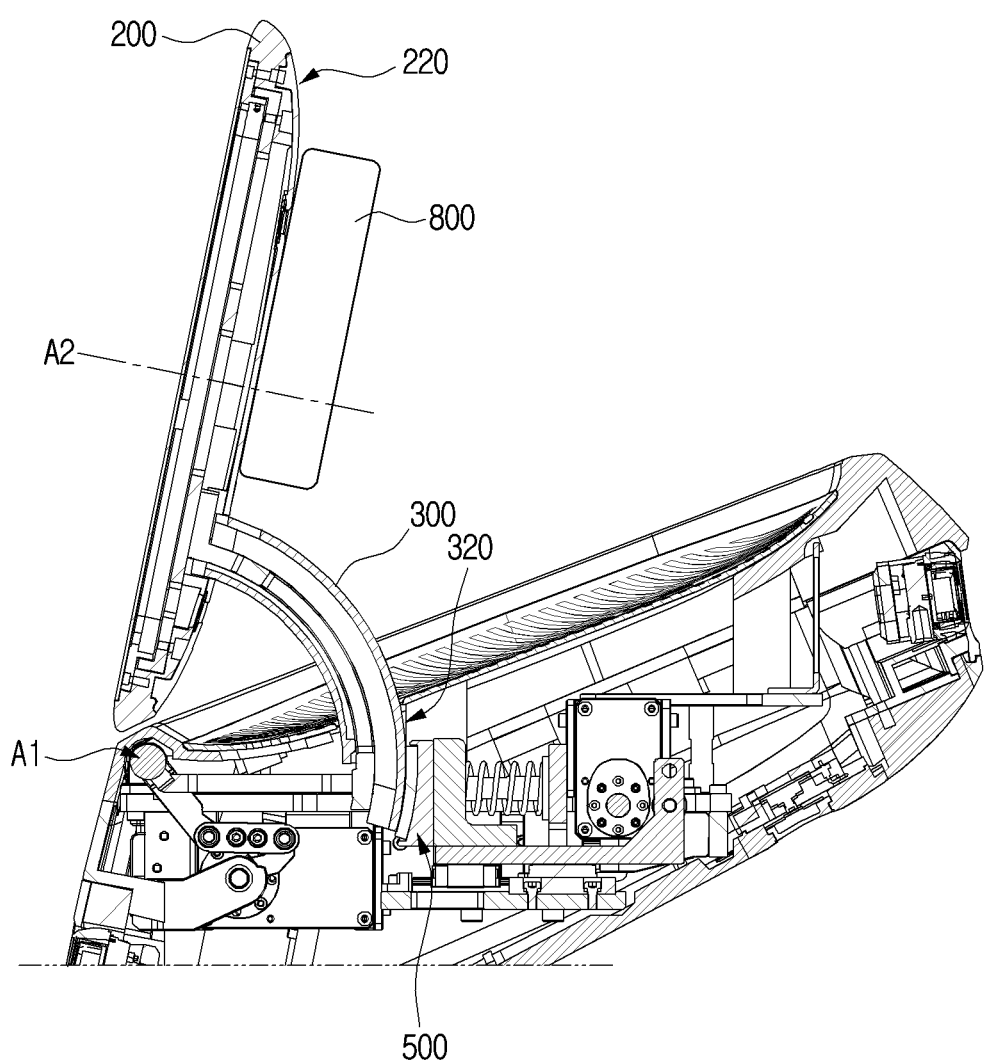
FIG. 11 is a side view illustrating a state wherein a third driving device is supported on a rear surface of a display member in a robot apparatus according to an embodiment of the disclosure.

FIG. 11 is a side view illustrating a state wherein a third driving device is supported on a rear surface of a display member in a robot apparatus according to an embodiment of the disclosure.

Referring to FIG. 11, the robot apparatus 1 may further include a third driving device 800 which rotates the display member 200 around an additional rotation axis A2, and is supported by the rear surface 220 of the display member 200. For example, the third driving device 800 may include a motor capable of rotating the display member 200.

The additional rotation axis A2 may be horizontal along the front and rear directions (that is, X axis direction in FIG. 1A). The display member 200 may roll while rotating around the additional rotation axis A2. Accordingly, the display member 200 may perform various interaction functions with a user.

Also, even if the third driving device 800 is supported by the rear surface 220 of the display member 200 and its center of gravity rises, the neck structure 300 is supported stably by the stopper structure 500. Thus, the display member 200 may not be shaken by vibration that may occur while driving of the robot apparatus 1, e.g., vibration transmitted from the ground or vibration according to a user's touch operation.

Figure 12:
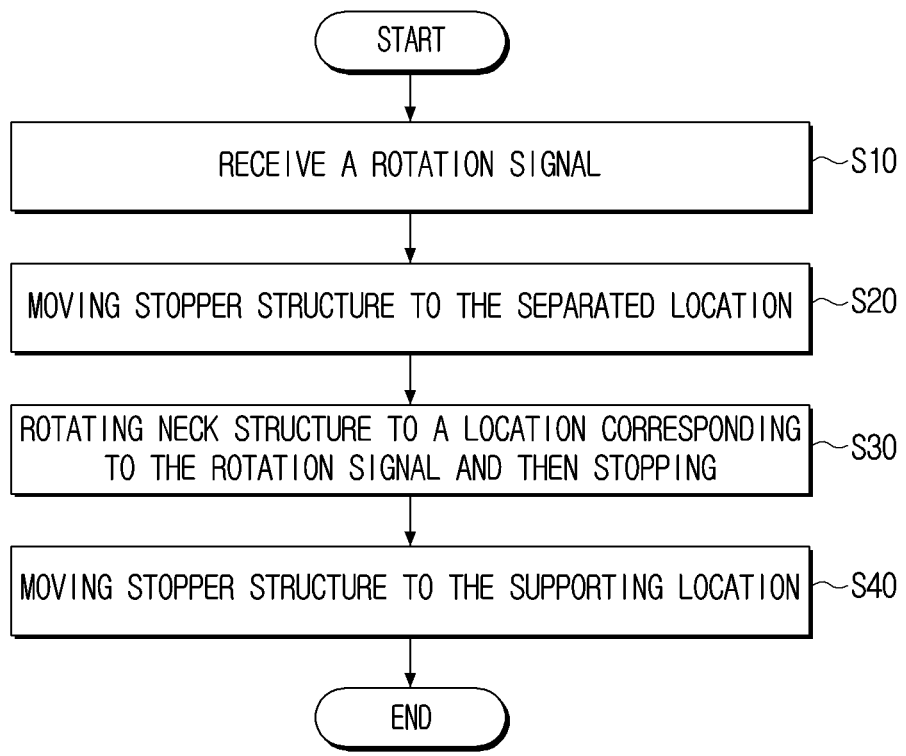
FIG. 12 is a flow chart for illustrating a controlling method of a robot apparatus according to an embodiment of the disclosure.

FIG. 12 is a flow chart for illustrating a controlling method of a robot apparatus according to an embodiment of the disclosure.

Referring to FIG. 12, a controlling method of the robot apparatus 1 according to an embodiment of the disclosure may include operations of receiving a rotation signal (S10), the stopper structure 500 moving to a separated location wherein the stopper structure 500 is spaced apart from the neck structure 300 (S20), the neck structure 300 rotating to a location corresponding to the rotation signal and then stopping (S30), and the stopper structure 500 moving to a supporting location contacting the rear surface 320 of the neck structure 300 (S40).

Accordingly, when the stopper structure 500 is in the supporting location, the neck structure 300 is not pushed to the rear direction, but is supported stably by the frictional force provided by the stopper structure 500. Thus, the display member 200 may not be shaken by vibration, e.g., transmitted from the ground or vibration according to a user's touch operation while driving of the robot apparatus 1.

Also, when the stopper structure 500 is disposed in the separated location, the neck structure 300 may rotate freely in a state of being spaced apart from the stopper structure 500. That is, when the display member 200 moves to the first location or the second location, the stopper structure 500 moves to the separated location, and thus the display member 200 and the neck structure 300 may rotate easily without being interrupted by the stopper structure 500.

While example embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. A robot apparatus comprising:
    a main body;
    a display;
    a neck structure rotatably connected to the main body, and of which an end portion is connected to a rear surface of the display;
    a first driving device configured to rotate the neck structure around a first axis of the robot apparatus such that the display is positioned in a first location, in which a display surface of the display faces toward an upper direction, or a second location, in which the display surface faces toward a front direction;
    a stopper structure provided on the main body to be adjacent to the neck structure; and
    a second driving device configured to move the stopper structure toward the front direction or a rear direction such that the stopper structure is positioned in a supporting location in which the stopper structure contacts a rear surface of the neck structure, or a separated location, in which the stopper structure is spaced apart from the neck structure.

2. The robot apparatus of claim 1,
    wherein the first driving device comprises:
    a shaft member rotatably connected to the main body, and provided along the first axis;
    a first motor configured to rotate the shaft member; and
    a rotation link connecting the neck structure and the shaft member.

3. The robot apparatus of claim 2,
    wherein the shaft member is provided below the display.

4. The robot apparatus of claim 2,
    wherein the first driving device further comprises:
    a first assistant link of which a first end portion is connected to the first motor;
    a second assistant link of which a first end portion is connected to a second end portion of the first assistant link; and
    a third assistant link of which a first end portion is connected to a second end portion of the second assistant link, of which a second end portion is connected to the shaft member, the third assistant link having a length longer than the first assistant link.

5. The robot apparatus of claim 2,
    wherein the stopper structure is provided at a same height as the shaft member.

6. The robot apparatus of claim 1,
    wherein the second driving device comprises a guide member, which contacts the stopper structure and configured to guide a moving path of the stopper structure.

7. The robot apparatus of claim 1,
    wherein the second driving device comprises:
    a cam member of which a cross section has an ellipse shape, and which contacts the stopper structure;
    a second motor configured to rotate the cam member;
    a support which is fixed on the main body; and
    a pressure member of which a front end portion is connected to the stopper structure, and of which a rear end portion is connected to the support, the pressure member being configured to pressurize the stopper structure to the front direction.

8. The robot apparatus of claim 7,
    wherein the second motor is configured to rotate the cam member in a first direction by 90 degrees, or rotate the cam member in a second direction opposite to the first direction by 90 degrees.

9. The robot apparatus of claim 1,
    wherein a radius of curvature of the rear surface of the neck structure is identical to a radius of curvature of a front surface of the stopper structure.

10. The robot apparatus of claim 1,
    wherein an upper surface of the main body extends from an upper end of a front surface of the main body toward the rear direction, and
    the display in the first location is on the upper surface of the main body.

11. The robot apparatus of claim 10,
    wherein the main body comprises a slot formed on the upper surface of the main body, and
    the neck structure is withdrawn to an outside of the main body, or is inserted to an inside of the main body through the slot.

12. The robot apparatus of claim 1, further comprising a processor configured to:
    based on a predetermined event occurring, control the second driving device such that the stopper structure moves to the separated location, and based on the stopper structure moving to the separated location, control the first driving device such that the neck structure rotates to a location corresponding to the predetermined event and stops after rotation, and based on the neck structure stopping, control the second driving device such that the stopper structure moves to the supporting location.

13. The robot apparatus of claim 1, further comprising:
    a third driving device configured to rotate the display around a second axis of the robot apparatus, and is supported by the rear surface of the display.

14. The robot apparatus of claim 1, further comprising:
    a traveling device configured to move the main body.

15. A method of controlling a robot apparatus comprising a main body, a display, a neck structure which connects the main body and the display, and a stopper structure provided adjacent to the neck structure, the method comprising:
    receiving a rotation signal;
    moving the stopper structure to a separated location in which the stopper structure is spaced apart from the neck structure;
    rotating the neck structure to a location corresponding to the rotation signal and stopping the neck structure after rotation; and
    moving the stopper structure to a supporting location in which the stopper structure contacts with the rear surface of the neck structure.

* * * * *